(12) United States Patent
Bukovnik et al.

(10) Patent No.: US 6,333,463 B1
(45) Date of Patent: Dec. 25, 2001

(54) WIRE SEPARATORS HAVING SEALANT MATERIAL RESERVOIRS AND CABLE SPLICE CLOSURES EMPLOYING SUCH SEPARATORS

(75) Inventors: Rudolf Robert Bukovnik, Chapel Hill; Jeffery Craig Judd, Wake Forest; Kenton Archibald Blue, Holly Springs, all of NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/715,269

(22) Filed: Nov. 17, 2000

(51) Int. Cl.[7] .................................................. H02G 15/076
(52) U.S. Cl. .......................................... 174/77 R; 174/92
(58) Field of Search ..................... 174/77 R, 92, 174/138 F, 88 R, 65 G, 152 G, 153 G

(56) References Cited

U.S. PATENT DOCUMENTS

| 4,438,294 | * | 3/1984 | Meltsch et al. | 174/88 R |
| 4,849,580 | | 7/1989 | Reuter | 174/92 |
| 4,888,070 | | 12/1989 | Clark et al. | 156/48 |
| 4,963,700 | | 10/1990 | Olsen et al. | 174/138 F |
| 5,043,537 | * | 8/1991 | Wade | 174/77 R X |
| 5,828,005 | | 10/1998 | Huynh-Ba et al. | 174/92 |

FOREIGN PATENT DOCUMENTS 58224725A   12/1983   (JP) ............................... B29D/23/00

OTHER PUBLICATIONS

ILSCO Corporation Catalog, Direct Burial and Above Grade Splice Kits, Type DBK/ASK, 1997.

* cited by examiner

Primary Examiner—Chau N. Nguyen
(74) Attorney, Agent, or Firm—Myers Bigel Sibley & Sajovec, P.A.

(57) ABSTRACT

Wire separators for separating two or more wires in a multicore cable splice closure are provided. Wire separators of the present invention may promote the positioning of sealant material adjacent a crotch region defined by two or more wires exiting a sheath of a multicore cable. Wire separators of the present invention may form part of a cable splice closure for environmentally sealing a multicore cable and may reduce or prevent entry of moisture into the closure through the crotch region. Wire separators of the present invention may include a longitudinally extending side wall. The side wall may further extend circumferentially so as to define a sealant material reservoir. At least a portion of the side wall may include a flexible material. The wire separator may include a first longitudinally extending channel member coupled to the side wall of the sealant material reservoir and defining a first channel, and a second longitudinally extending channel member circumferentially spaced from the first channel member, coupled to the side wall of the sealant material reservoir and defining a second channel. A sealant material may be positioned within the sealant material reservoir. Cable splice closures employing such wire separators as well as methods for forming such cable splice closures are also provided.

25 Claims, 8 Drawing Sheets

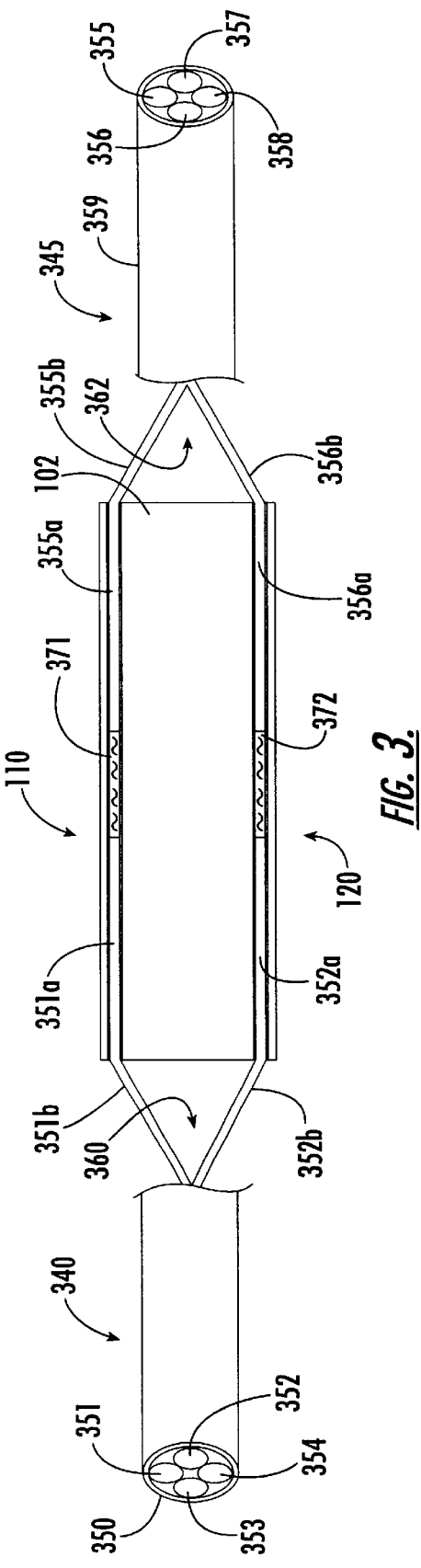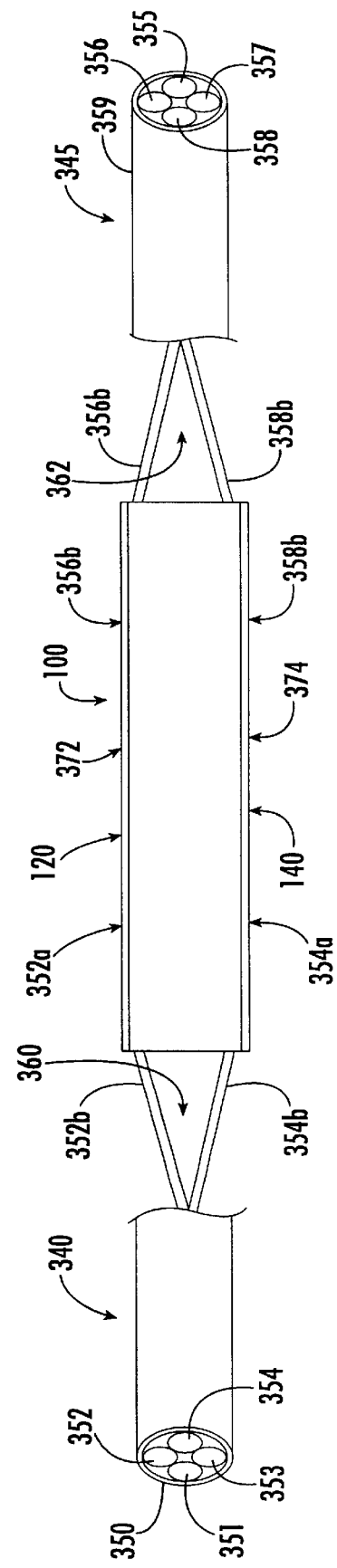

WIRE SEPARATORS HAVING SEALANT MATERIAL RESERVOIRS AND CABLE SPLICE CLOSURES EMPLOYING SUCH SEPARATORS

FIELD OF THE INVENTION

This invention relates to sealing of cables. More particularly, this invention relates to sealing of multicore cables.

BACKGROUND OF THE INVENTION

In the electrical utilities industry, maintaining cable integrity may be critical. A loss of cable integrity, for example, a short circuit in a high voltage cable, may result in a crippling power outage, or, even worse, a loss of life. One everyday task that may pose a great threat to cable integrity is the formation of electrical connections.

When electrical connections are formed, a bare metal surface may be exposed, such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

U.S. Pat. No. 5,828,005 to Huynh-Ba et al. proposes the use of a gel-filled closure for environmentally protecting a connector forming a connection between a cable and at least one electrical component. The closure may include first and second cavitied bodies, each having two lateral sides and two end sides. The closure may have a hinge joining the first and second bodies along a lateral edge. The closure may be integrally made of a thermoplastic material by injection molding. The thermoplastic material may have a tensile yield strength of at least 3,500 psi. The closure may include reinforcing ribs which decrease the deflection in the closure near fingers as the enclosed gel expands during service at elevated temperatures.

U.S. Pat. No. 4,888,070 to Clark et al. proposes a flexible envelope having therein a sealing material.

U.S. Pat. No. 4,849,580 to Reuter proposes an environmental closure having an outer, openable, shell with an internal biasing mechanism. The shell may contain viscous sealant material. Pressure from the biasing mechanism may operate to force sealant between adjacent wires. The adjacent wires may form a pigtail splice.

U.S. Pat. No. 4,963,700 to Olsen et al. proposes a closure provided to facilitate an environmental seal about a multi-wire splice or junction.

An additional problem may arise when the cables to be connected are multicore cables. Multicore cables may typically contain two or more wires within an insulating sheath. These wires may, for example, carry different phases of an electrical power signal. When electrical connections are made to such wires, the connections may not only need to be protected from the environment, but also need to be protected from one another.

JP58224725A proposes a protection cover that is obtained by inserting and coupling tubular structures in which plural wires can be inserted separately inside a heat-shrinkable tube of which both ends are open.

Other closures may provide a separator that separates the wires of the multicore cable from one another.

While gel filled closures that incorporate such separators may protect the wires of a multicore cable from one another, they may not adequately protect the wires from the environment. The orientation of the cables between the end of the sheath and the separator may limit the ability of the gel from the gel filled closure to adequately seal the wires. As a result, a tear in the sheath of the multicore cable may allow moisture to enter the gel filled closure. Water may enter the multicore cable through the tear in the sheath and then move down the interior of the multicore cable into the gel filled closure.

SUMMARY OF THE INVENTION

According to the present invention, wire separators for separating two or more wires in a multicore cable splice closure are provided. Wire separators of the present invention may promote the positioning of sealant material adjacent a crotch region defined by two or more wires exiting a sheath of a multicore cable. Wire separators of the present invention may form part of a cable splice closure for environmentally sealing a multicore cable and may reduce or prevent entry of moisture into the closure through the crotch region.

According to embodiments of the present invention, a wire separator includes a longitudinally extending side wall. The side wall further extends circumferentially so as to define a sealant material reservoir. At least a portion of the side wall comprises a flexible material. The wire separator includes a first longitudinally extending channel member coupled to the side wall of the sealant material reservoir. The first channel member defines a first channel. The wire separator includes a second longitudinally extending channel member circumferentially spaced from the first channel member. The second channel member is coupled to the side wall of the sealant material reservoir. The second channel member defines a second channel. A sealant material is positioned within the sealant material reservoir.

In embodiments of the present invention, the sealant material reservoir may have a first open end. The sealant material reservoir may have a second open end longitudinally spaced from the first open end. The sealant material reservoir may have a rupturable seal member on at least one end thereof. The entire side wall may comprise the flexible material.

In other embodiments of the present invention, the wire separator may include a third longitudinally extending channel member circumferentially spaced from the first and the second channel members. The third channel member may be coupled to the side wall of the sealant material reservoir and may define a third channel. The wire separator may include a fourth longitudinally extending channel member circumferentially spaced from the first, the second, and the third longitudinal channel members. The fourth channel member may be coupled to the side wall of the sealant material reservoir and may define a fourth channel.

In other embodiments of the present invention, a first portion of the side wall may define a first wall of the first channel member. A second portion of the side wall may define a first wall of the second channel member. A third portion of the side wall may include a first wall of the third channel member. A fourth portion of the side wall may include a first wall of the fourth channel member.

In still other embodiments of the present invention, a portion of the first channel member may define a second wall of the third channel member. A portion of the second channel member may define a second wall of the fourth channel member.

In embodiments of the present invention, the flexible material may have a flexural modulus between about 10,000 psi and about 100,000 psi. The flexible material may include a polymeric material. The sealant material may be a gel.

A cable splice closure for environmentally sealing a multicore cable having at least a first and a second wire is also provided by the present invention. The cable splice closure includes a wire separator and a closure. The wire separator includes a longitudinally extending side wall. The side wall extends circumferentially so as to define a sealant material reservoir. The side wall comprises a flexible material. The wire separator includes a first longitudinally extending channel member coupled to the side wall of the sealant material reservoir. The first channel member defines a first channel configured to receive a first portion of the first wire therein. The wire separator includes a second longitudinally extending channel member circumferentially spaced from the first channel member. The second channel member is coupled to the side wall of the sealant material reservoir. The second channel member defines a second channel configured to receive a first portion of the second wire therein. A sealant material is positioned within the sealant material reservoir. The closure substantially surrounds the wire separator.

In embodiments of the present invention, the closure may have a first body member having a first compression member extending from an interior surface thereof. The closure may have a second body member coupled to the first body member and having a second compression member extending from an interior surface thereof. The first and the second compression members may be positioned adjacent the side wall of the sealant material reservoir when the closure substantially surrounds the wire separator. In other embodiments of the present invention, the cable splice closure may include a multicore cable section having a first and a second wire. The first wire may have a first portion positioned in the first channel and the second wire may have a first portion positioned in the second channel.

In still other embodiments of the present invention, the multicore cable may include a third wire and a fourth wire. The wire separator may include a third longitudinally extending channel member circumferentially spaced from the first and the second channel members. The third channel member may be coupled to the side wall of the sealant material reservoir and may define a third channel. The wire separator may include a fourth longitudinally extending channel member circumferentially spaced from the first, the second, and the third channel members. The fourth channel member may be coupled to the side wall of the sealant material reservoir and may define a fourth channel. The third wire may have a first portion positioned in the third channel and the fourth wire may have a first portion positioned in the fourth channel.

In yet other embodiments of the present invention, the first, the second, the third, and the fourth wires may each have a second portion. The second portions of the first, the second, the third, and the fourth wires may be adjacent one another and define a crotch region. The sealant material reservoir may have a first open end adjacent the crotch region. The sealant material from the sealant material reservoir may be positioned adjacent the crotch region. The inner surface of the closure may have at least one protrusion positioned adjacent the side wall of the sealant material reservoir when the closure substantially surrounds the wire separator so as to move a portion of the sealant material through the open end and into a region substantially adjacent the crotch region. The closure may have an inner surface that is substantially covered with sealant material.

A cable splice kit for environmentally sealing a multicore cable section is also provided by the present invention. The cable splice kit may include a wire separator and a closure. The wire separator may include a longitudinally extending side wall. The side wall may further extend circumferentially so as to define a sealant material reservoir. The side wall may comprise a flexible material. The wire separator may include a first longitudinally extending channel member coupled to the side wall of the sealant material reservoir. The first channel member may define a first channel configured to receive a first portion of the first wire therein. The wire separator may include a second longitudinally extending channel member circumferentially spaced from the first channel member. The second channel member may be coupled to the side wall of the sealant material reservoir. The second channel member may define a second channel configured to receive a first portion of the second wire therein. A sealant material may be positioned within the sealant material reservoir.

Methods of forming multicore cable splice closures are also provided by the present invention. The methods of forming multicore cable splice closures include positioning a first wire of a multicore cable in a first channel of a wire separator having a sealant material reservoir containing sealant material, positioning a second wire of the multicore cable in a second channel of the wire separator, enclosing the first wire, the second wire, and the wire separator in a closure, and compressing the sealant material reservoir to transfer the sealant material from an open end of the sealant material reservoir into a crotch region defined by the first and the second wires. The enclosing operations and the compressing operations may be performed substantially simultaneously.

The present invention provides apparatus that may protect a multicore cable section from the environment. More specifically, the present invention provides a wire separator having a sealant material reservoir. The wire separator may form part of a multicore cable splice closure that may protect multicore cable sections from moisture that penetrates the multicore cable's sheath. The present invention may also provide methods of forming such multicore cable splice closures.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

FIG. 3 is a top view of embodiments of the wire separator illustrated in FIG. 1 separating wires of a multicore cable.

FIG. 4 is a side view of the embodiments of the wire separator illustrated in FIG. 3.

DETAILED DESCRIPTION OF THE PREFERRED EMBODIMENTS

The present invention now will be described more fully hereinafter with reference to the accompanying drawings, in which preferred embodiments of the invention arc shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
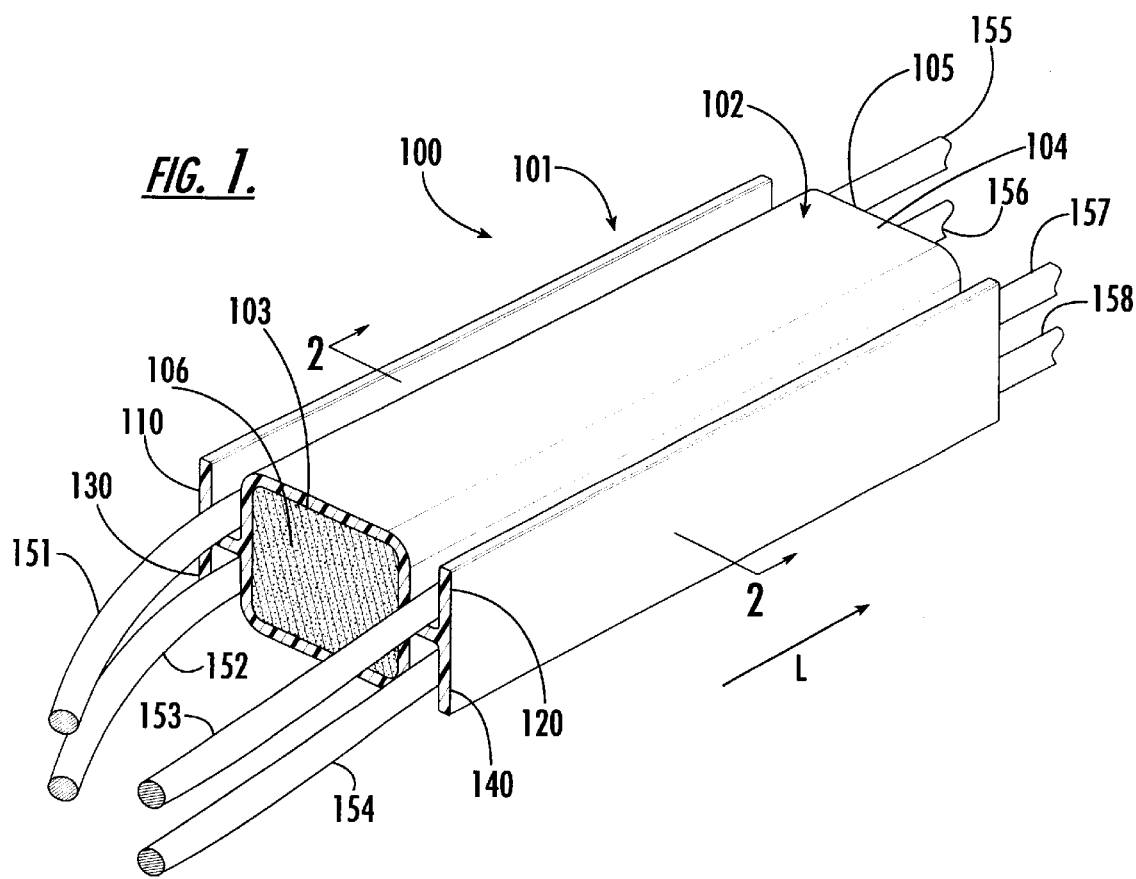
FIG. 1 is a perspective view of embodiments of a wire separator according to the present invention with wires positioned in the channels of the wire separator.

Referring to FIG. 1, a wire separator according to preferred embodiments of the present invention is shown therein and generally designated 100. The wire separator 100 has a body 101 having a sealant material reservoir 102 defined by a longitudinally extending side wall 104. As used herein, references to longitudinal refers generally to an axis along which wires are placed relative to the wire separator as illustrated by the arrow L in FIG. 1. The side wall 104 extends circumferentially so as to define the sealant material reservoir 102 containing a sealant material 106. As shown in FIG. 1, the side wall 104 extends circumferentially to define a substantially rectangular cross section for the sealant material reservoir 102 when not compressed. However, it is to be understood that the shape of the cross section may be various shapes defining the sealant material reservoir including circular, oval, etc. A substantially rectangular shape (which, as used herein, includes a square shape) is preferred.

As shown in FIG. 1, a first longitudinal channel member 110 is coupled to the side wall 104 of the sealant material reservoir 102. A second longitudinal channel member 120 is circumferentially spaced from the first channel member 110. The second longitudinal channel member 120 is coupled to the side wall 104. A third longitudinal channel member 130 is circumferentially spaced from the first and the second channel members 110 and 120, respectively, and is coupled to the side wall 104. A fourth longitudinal channel member 140 is circumferentially spaced from the first, second, and third channel members 110, 120, and 130, respectively. The fourth channel member 140 is coupled to the side wall 104. While the embodiments illustrated in FIG. 1 show channel members 110, 120, 130, and 140 having a substantially U shape, it is to be understood that the shape of the channel members of the present invention is not critical. For example, channel members of the present invention may be substantially L shaped or substantially V shaped. A U shape is preferred, however. Although the embodiments illustrated in FIG. I show channel members integrally molded as pairs of channel members sharing a wall, it is to be understood that channel members of the present invention need not be integrally molded as pairs sharing a wall, although this configuration is preferred.

As illustrated in FIG. 1, wires 151 through 158 are positioned adjacent the wire separator 100. Specifically, wires 151 and 155 are positioned adjacent the first longitudinal channel member 110, wires 152 and 156 are positioned adjacent the second longitudinal channel member 120, wires 153 and 157 are positioned adjacent the third longitudinal channel member 130, and wires 154 and 158 are positioned adjacent the fourth longitudinal channel member 140. Although the embodiments of FIG. 1 show wires 151, 152, 153, and 154 as being different from wires 155, 156, 157, and 158, respectively, as one may expect if two multicore cables were being spliced together, it is to be understood that wires 151, 152, 153, and 154 may be the same as wires 155, 156, 157, and 158, respectively.

As shown in FIG. 1, the sealant material reservoir 102 has a first open end 103 and a second open end 105 longitudinally spaced from the first open end 103. Sealant material reservoirs of the present invention preferably have at least one open end, and more preferably have two open ends. Sealant material reservoirs of the present invention preferably have volumes that are dependent on the geometry and design of the splice that is being separated and sealed. The volume of the sealant material reservoir and volume of sealant material in the reservoir is preferably such that the volume of sealant material displaced from the sealant material reservoir into the crotch area by closing a closure around the wire separator is equal to or greater than the volume of the crotch area.

Wire separators of the present invention may comprise various materials understood by those skilled in the art. Wire separators of the present invention preferably comprise an electrically insulating material. The electrically insulating material is preferably a polymeric material. Preferred polymeric materials are selected from the group consisting of ethylene-propylene-diene monomer (EPDM) elastomers, silicone elastomers, thermoplastic elastomers, polypropylene/rubber blends, polyurethanes, nitrile rubber, neoprene rubber, polyisoprene, polybutadiene, epichlorohydrin and polychloroprene. More preferred polymeric materials are selected from the group consisting of polyproylene/rubber blends and polyurethanes.

At least a portion of the longitudinal side wall 104 as illustrated in FIG. 1 is formed of a flexible material. Preferably, at least 25% of the circumference of the side wall 104 is formed of flexible material. More preferably, at least 50% of the circumference of the side wall 104 is formed of flexible material, and most preferably, the entire side wall 104 is formed of the flexible material. When only a portion of the side wall 104 is formed of the flexible material, it is preferable that the portion of the side wall that is formed of the flexible material does not define a wall of a channel member, for example side wall portions 104a and 104b described below with reference to FIGS. 8–10. The flexible material is preferably a polymeric material, more preferably a thermoplastic polymeric material, and, most preferably, a thermoplastic elastomer. Preferred polymeric materials may be selected from the group consisting of polyurethanes and polypropylene/rubber blends. While the embodiments illustrated in FIG. 1 show longitudinal channel members and a longitudinal side wall made of the same material, it is to be understood that longitudinal channel members and longitudinal side walls of the present invention may be made from different materials.

The flexible material has preferred physical characteristics. For example, the flexible material preferably has a Shore hardness between about Shore A 50 and about Shore D 70. The flexible material preferably has a flexural modulus that is between about 10,000 psi and about 100,000 psi. More preferably, the flexural modulus is between about 10,000 psi and about 40,000 psi. The ultimate elongation of the flexible material is preferably between about 200% and about 800%, and is more preferably between about 250% and 650%. The tensile strength of the flexible material is preferably between about 600 psi and about 8,000 psi. A particularly preferred flexible material is the thermoplastic rubber sold under the tradename Santoprene® 101-55, available from Advanced Elastomer Systems of St. Louis, Mo.

Wire separators of the present invention may be manufactured using various methods understood by those skilled in the art including, but not limited to, extrusion, injection molding and blow molding. Wire separators of the present invention are preferably manufactured by extrusion processes. When portions of the channel members comprise a material different from the flexible material used for the side wall, wire separators of the present invention are preferably manufactured by a coextrusion process.

The sealant material 106 may be a variety of sealant materials as will be understood by those skilled in the art including, but not limited to, greases, gels, thixotropic compositions, and mastics. The sealant material is preferably a gel. The term "gel" has been used in the prior art to cover a vast array of materials from greases to thixotropic compositions to fluid-extended polymeric systems. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Preferred gels for use in this invention are silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat No. 5,079,300 to Dubrow et al. (hereinafter "Dubrow '300"). These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is involved in the preparation of these gels, they are sometimes referred to as thermosetting gels. An especially preferred gel is a silicone gel produced from a mixture of divinyl terminated polydimethylsiloxane, tetraks (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetramethylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aromatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be considered are EPDM rubber based gels, as described in U.S. Pat. No. 5,177,143 to Chang et al. However, these gels tend to continue to cure over time and thus may become unacceptably hard with aging.

Yet another class of gels which may be suitable are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The gel has a hardness, as measured by a texture analyzer, preferably between about 5 and 100 grams force, more preferably between about 5 and 60 grams force, and most preferably between about 10 and 40 grams force. The gel has a stress relaxation that is preferably less than about 80%, more preferably less than about 50%, and most preferably less than about 35%. The gel has a tack that is preferably greater than about 1 gram, more preferably greater than about 5 grams, and most preferably between about 10 and 50 grams. As will be understood by those skilled in the art, hardness, tack and stress relaxation may be adjustable for specific applications. The gel has an elongation, as measured according to the procedures of ASTM D-638, of at least 55%, more preferably of at least 500%, and most preferably of at least 1000%. Suitable gel materials include Powergel™ sealant gel available from Tyco Electronics Energy Division of Fuquay-Varina, N.C. under the Raychem™ brand.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.0 mm/second. The stress relaxation is the ratio of the initial force ($F_i$) resisting the probe at the pre-set penetration depth minus the force resisting the probe ($F_f$) after 1 min divided by the initial force ($F_i$), expressed as a percentage. That is, percent stress relaxation is equal to $$\frac{(F_i - F_f)}{F_i} \times 100\%$$

where $F_i$ and $F_f$ are in grams. In other words the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

Figure 2:
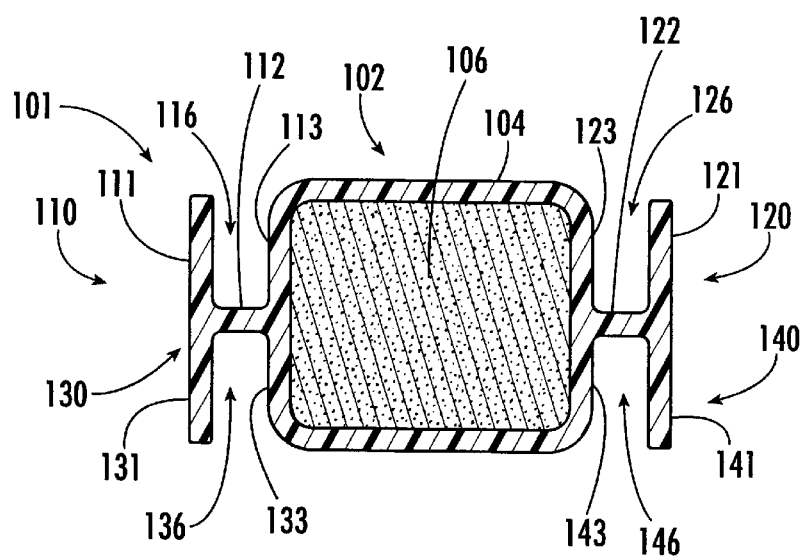
FIG. 2 is a lateral cross-sectional view of the embodiments illustrated in FIG. 1 taken along the line 2—2 of FIG. 1 and wherein the wires are omitted for clarity.

The present invention will now be described with reference to the lateral cross-section, as illustrated in FIG. 2, of the embodiments shown in FIG. 1. The first channel member 110 has a first portion 111, a second portion 112, and a third portion 113. The first, second, and third portions 111, 112, and 113, respectively, of the first channel member 110 define a first channel 116. The third portion (wall) 113 of the first channel member 110, as illustrated in FIG. 2, is a portion of the longitudinal side wall 104.

As shown in FIG. 2, the second channel member 120 has a first portion 121, a second portion 122, and a third portion 123. The first, second, and third portions 121, 122, and 123, respectively, of the second longitudinal channel member 120 define a second channel 126. The third portion (wall) 123 of the second channel member 120, as illustrated in FIG. 2, is a portion of the side wall 104.

As illustrated in FIG. 2, the third channel member 130 has a first portion 131, a second portion 112, and a third portion 133. The first, second, and third portions 131, 112, and 133, respectively, of the third longitudinal channel member 130 define a third channel 136. The third portion (wall) 133, of the third channel member 130, as illustrated in FIG. 2, is a portion of the side wall 104. The first and third longitudinal members 110 and 130, respectively, share the second portion 112. While the illustrated embodiments of FIG. 2 show first and third longitudinal channel members 110 and 130, respectively, that share the second portion 112, it is to be understood that first and third channel members may have no common portions or may share more portions.

As shown in FIG. 2, the fourth channel member 140 has a first portion 141, a second portion 122, and a third portion 143. The first, second, and third portions 141, 122, and 143, respectively, of the fourth channel member 140 define a fourth channel 146. The third portion 143 of the fourth channel member 140, as illustrated in FIG. 2, is a portion of the side wall 104. The second and the fourth channel members 120 and 140 share the second portion 122. Although the illustrated embodiments of FIG. 2 show second and fourth channel members 120 and 140, respectively, that share the second portion 122, it is to be understood that second and fourth channel members may have no common portions or may share more portions. As illustrated in FIG. 2, the spaced apart wire channels 116, 126, 136, and 146 are defined in the body 101.

While the illustrated embodiments of FIG. 2 show the first, second, third, and fourth channel members 110, 120, 130, and 140, respectively, having third portions 113, 123, 133, and 143, respectively, that are also a portion of the side wall 104, it is to be understood that one or more of the channel members of the present invention may have no common portions or may have more portions that are also a portion of the side wall 104. Although the illustrated embodiments of FIG. 2 show a wire separator 100 having four channel members 110, 120, 130, and 140, respectively, it is to be understood that wire separators of the present invention may have two or more channel members.

The present invention will now be described with reference to a top view, illustrated in FIG. 3, of embodiments of the present invention separating the wires of a multicore cable. The wire separator 100 has a first channel member 110 that defines a first channel, a second channel member 120 that defines a second channel, and a sealant material reservoir 102 as described above with reference to FIGS. 1 and 2. A first multicore cable 340 has a first sheath 350 surrounding a first wire 351, a second wire 352, a third wire 353, and a fourth wire 354. A second multicore cable 345 has a second sheath 359 surrounding a fifth wire 355, a sixth wire 356, a seventh wire 357, and an eighth wire 358. While the illustrated embodiments of FIG. 3 show multicore cables 340 and 345 having four wires, it is to be understood that multicore cables of the present invention may have two or more wires.

As shown in FIG. 3, the first wire 351 has a first portion 351a and a second portion 351b. The fifth wire 355 has a first portion 355a and a second portion 355b. The second wire 352 has a first portion 352a and a second portion 352b. The sixth wire 356 has a first portion 356a and a second portion 356b. The first portion 351a of the first wire 351 is positioned in the first channel defined by the first channel member 110. The first portion 355a of the fifth wire 355 is positioned in the first channel defined by the first channel member 110. The first portion 351a of the first wire 351 is connected to the first portion 355a of the fifth wire 355 by the splice connector 371. The first portion 352a of the second wire 352 is positioned in the second channel defined by the second channel member 120. The first portion 356a of the sixth wire 356 is positioned in the second channel defined by the second channel member 120. The first portion 352a of the second wire 352 is connected to the first portion 356a of the sixth wire 356 by a connector 372.

As shown in FIG. 3, the second portion 351b of the first wire 351 is adjacent the second portion 352b of the second wire 352 and defines a portion of a first crotch region 360. The second portion 355b of the fifth wire 355 is adjacent the second portion 356b of the sixth wire 356 and defines a portion of a second crotch region 362.

The present invention will now be further described with reference to a side view, illustrated in FIG. 4, of the embodiments illustrated in FIG. 3. The wire separator 100 has a second channel member 120 that defines a second channel and a fourth channel member 140 that defines a fourth channel as described above with reference to FIGS. 1 and 2. The second wire 352 has a first portion 352a and a second portion 352b. The sixth wire 356 has a first portion 356a and a second portion 356b. The fourth wire 354 has a first portion 354a and a second portion 354b. The eighth wire 358 has a first portion 358a and a second portion 358b. The first portion 352a of the second wire 352 is positioned in the second channel defined by the second channel member 120. The first portion 356a of the sixth wire 356 is positioned in the second channel defined by the second channel member 120. The first portion 352a of the second wire 352 is connected to the first portion 356a of the sixth wire 356 by a connector 372. The first portion 354a of the fourth wire 354 is positioned in the fourth channel defined by the fourth channel member 140. The first portion 358a of the eighth wire 358 is positioned in the fourth channel defined by the fourth channel member 140. The first portion 354a of the fourth wire 354 is connected to the first portion 358a of the eighth wire 358 by a connector 374.

While the embodiments illustrated in FIGS. 3 and 4 show wires connected by connectors, for example the first wire 351 connected to the fifth wire 355 with connector 371, it is to be understood that wires of the present invention need not be connected together and need not be discontinuous. For example, the first wire 351 and the fifth wire 355 could be the same continuous wire.

As shown in FIG. 4, the second portion 352b of the second wire 352 is adjacent the second portion 354b of the fourth wire 354 and defines a portion of the first crotch region 360. The second portion 356b of the sixth wire 356 is adjacent the second portion 358b of the eighth wire 358 and defines a portion of the second crotch region 362.

Figure 5:
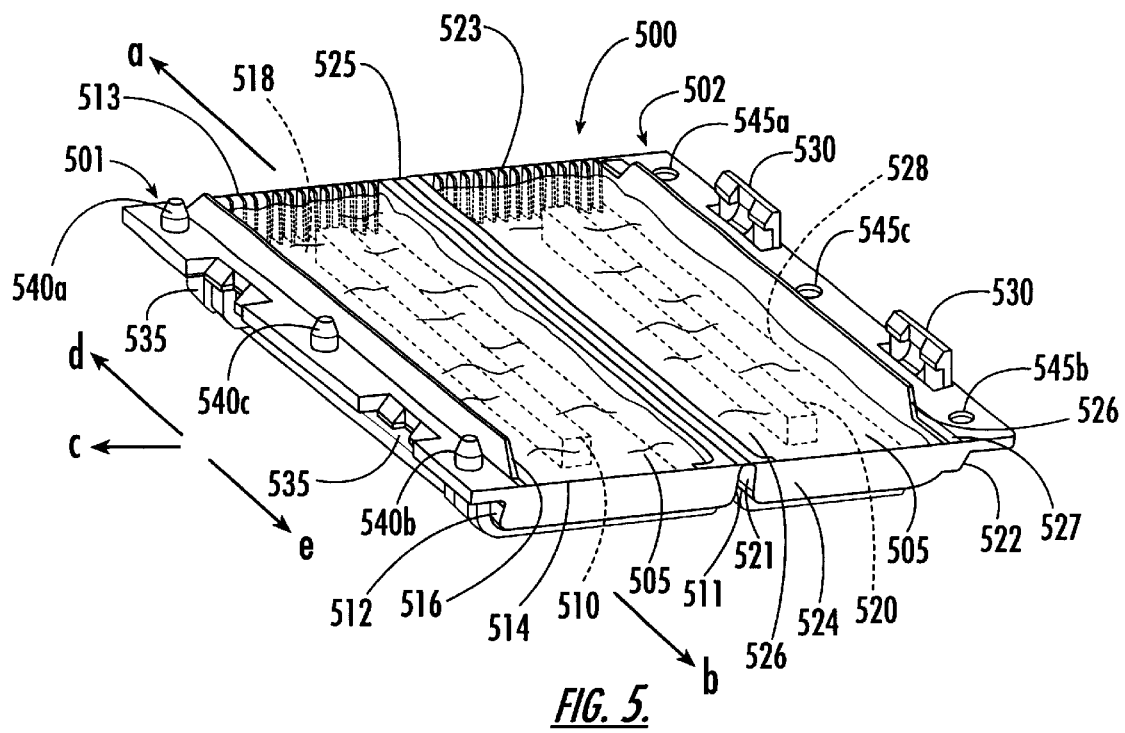
FIG. 5 is a perspective view of a closure according to the present invention wherein the closure is in an open position.
Figure 7:
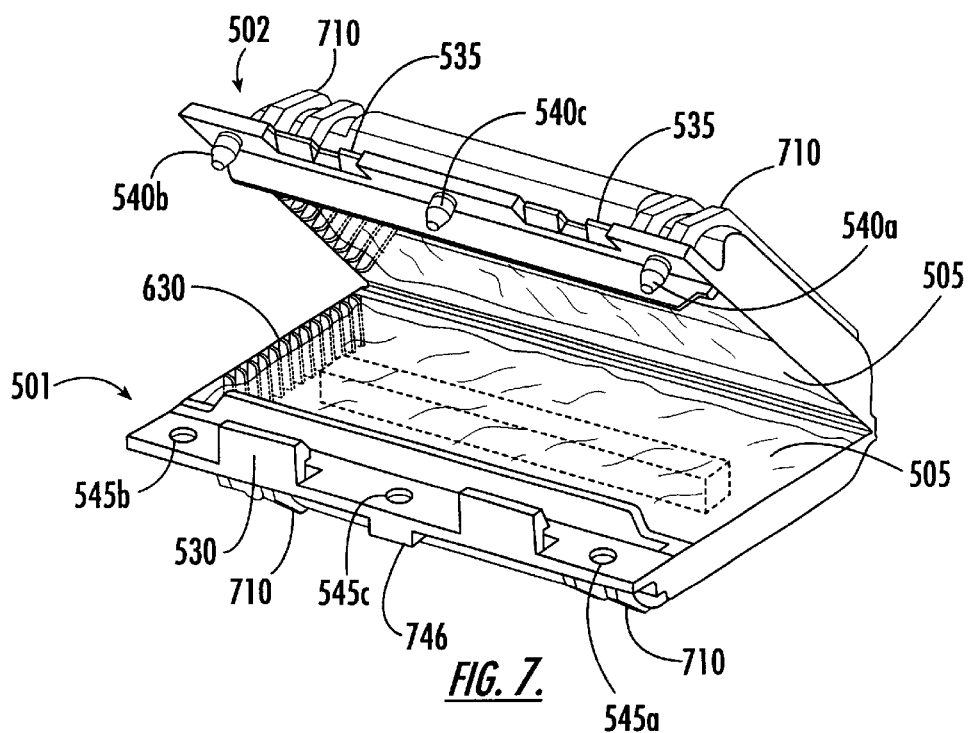
FIG. 7 is a perspective view of the embodiments of FIG. 5 in a partially closed position.

FIGS. 5–7 illustrate preferred embodiments of a closure 500 according to the present invention. Referring now to FIG. 5, embodiments of a closure according to the present invention will now be described. The closure 500 has a first body member 501 having a first lateral side 511 and a second lateral side 512 laterally spaced from the first lateral side 511. The first body member 501 also has a first end side 513 and a second end side 514 longitudinally spaced from the first end side 513. The lateral sides 511 and 512 and the end sides 513 and 514 define an interior cavity 518. The closure 500 has a second body member 502 having a first lateral side 521 and a second lateral side 522 laterally spaced from the first lateral side 521. The second body member 502 also has a first end side 523 and a second end side 524 longitudinally spaced from the first end side 523. The lateral sides 521 and 522 and the end sides 523 and 524 define an interior cavity 528. The end sides 513, 514, 523, and 524 may be frangible, meaning that they rupture when the first and the second body members 501 and 502, respectively, are positioned to substantially surround a wire separator and a multicore cable section. The first and second body members 501 and 502 respectively are joined to each other along the first lateral sides 511 and 521, respectively, by a hinge 525. While the embodiments of FIG. 5 show the hinge 525 as a living hinge, it is to be understood that the hinge may be various hinges understood by those skilled in the art including, but not limited to, an integral hinge or a door hinge. The first and the second body members 501 and 502, respectively, are sized and shaped such that they can pivot about hinge 525 and be configured to define an enclosed volume that may substantially surround a wire separator and a multicore cable section. A sealant material 505, as described above with reference to FIG. 1, substantially fills each of the first and the second body members 501 and 502.

As illustrated in FIG. 5, a first compression member 510 extends from the interior side of the first body member 501 and a second compression member 520 extends from the interior side of the second body member 502. The first and the second compression members 510 and 520, respectively, may aid in compressing the sealant material reservoir 102 of the wire separator 100 as the closure 500 is configured to substantially surround the wire separator 100 and the wires 351, 352, 353, and 354 of a multicore cable section 340, for example. Compression members 510 and 520, respectively, may have a length that is between 1% and 200% of the length of the wire separator. The compression members 510 and 520, respectively, are preferably between about 25% and 175%, more preferably between about 50% and 150%, and most preferably between about 75% and 125% of the length of the wire separator.

While the embodiments of FIG. 5 show compression members 510 and 520 having a substantially rectangular lateral cross-section, it is to be understood that compression members of the present invention may have various lateral cross-sections including, but not limited to, U-shaped and V-shaped lateral cross-sections. Although the embodiments of FIG. 5 illustrate the first and the second body members 501 and 502, respectively, each having one compression member 510 and 520, respectively, it is to be understood that body members of the present invention may have fewer or more compression members. When one or more body members 501 and 502, respectively, of the present invention have no compression members, it is preferred that the wire separator 100 have one or more rigid longitudinal channel members 110, 120, 130, or 140. The wire separator may then be positioned in the closure such that the rigid channel member acts as a compression member. For example, the wire separator 100 described above with reference to FIGS. 1 and 2 may be positioned such that the rigid channel members 110 and 130 are adjacent the interior side of the body member 501.

While the embodiments of FIG. 5 illustrate first and second compression members 510 and 520, respectively, having a constant lateral cross-sectional area along their lengths, it is to be understood that compression members of the present invention may have lateral cross-sectional areas that are not constant. For example, compression members of the present invention may have a larger cross-sectional area in the center and taper to a smaller lateral cross-sectional area at the ends. Although the embodiments of FIG. 5 illustrate first and second compression members 510 and 520, respectively, that are solid longitudinally extending members, it is to be understood that compression members of the present invention may be a plurality of longitudinally spaced compression members.

As shown in FIG. 5, the first body member 501 has a first flap 516 extending from the second lateral side 512 thereof and projecting above the top level of the interior cavity 518. The second body member 502 has a second flap 526 extending from the second lateral side 522 thereof and projecting above the top level of the interior cavity 528. Although the embodiments of FIG. 5 show closures 500 having body members with first and second flaps 516 and 526, respectively, it is to be understood that closures of the present invention may have one or fewer flaps. Where a single flap is used instead of a pair of flaps, a somewhat wider flap is preferred, for example one which is about twice as wide as it would be when a pair of flaps is used.

When the first and the second body members 501 and 502, respectively, are closed around the wire separator and the multicore cable section, the sealant material 505 may initially be squeezed outwards, in the directions indicated by arrows a, b, and c. Excessive flow of gel in direction c tends to interfere with the locking mechanism (described below) and increase the closing force required. However, the first and the second flaps 516 and 526, respectively, may overlap each other during the closure operation, acting as barriers to gel flow in the c direction and re-directing gel flow in the longitudinal direction indicated by arrows d and e. This may result in the advantageous effect of reducing the closing force and improving the quality of the lateral seal. While the embodiments of FIG. 5 show the first flap 516 overlapping on the outside of the second flap 526 and the second body member 502 having a groove 527 for receiving the first flap 516, it is to be understood that the mode of overlap and positioning of the groove 527 may be reversed. While the exact length of the first and the second flaps 516 and 526, respectively, is not critical, they are preferably sufficiently long to serve the intended function of damming the undesired lateral flow of the sealant material 505. Preferably, the first and the second flaps 516 and 526, respectively, extend along substantially the entire length of lateral sides 512 and 522, respectively. Similarly, the width or depth of the first and the second flaps 516 and 526, respectively, is not critical. They are preferably of sufficient width to achieve the aforementioned damming function.

As illustrated in FIG. 5, the first body member 501 has a plurality of alignment buttons 540a–540c along lateral side 512 and the second body member 502 has a corresponding number of alignment holes 545a–545c along lateral side 522. A first button 540a is disposed near the first end side 513, a second button 540b is disposed near the second end side 514, and a third button 540c is disposed substantially midway between the first button and the second button 540a and 540b, respectively. A first hole 545a is disposed near the first end side 523, a second hole 545b is disposed near the second end side 524, and a third hole 545c is disposed substantially midway between the first hole and the second hole 545a and 545b, respectively. While the embodiments of FIG. 5 show a first body member having three buttons and a second body member having three holes, other numbers and arrangements of buttons and holes may be used. The buttons 540a–540c and the holes 545a–545c are sized and positioned such that when the first and the second body members 501 and 502, respectively, are pivoted about hinge 525 and configured to define an enclosed volume, each button is inserted through a corresponding hole, i.e., the first button 540a through the first hole 545a, the second button 540b through the second hole 545b, etc.

As shown in FIG. 5, a locking mechanism for securing the first and the second body members 501 and 502, respectively, in a closed position is provided. While the embodiments of FIG. 5 illustrate a locking mechanism having cantilevered snap joints consisting of snap arms 530 and receptacles 535, it is to be understood that other locking mechanisms, such as torsion snap joints, annular snap joints, or longitudinal pin and socket members may be used (though the latter may not be sufficiently strong in larger closure configurations). Preferably the locking mechanism should be relatively easy to activate and reversible to permit re-entry, yet sturdy enough to prevent accidental opening.

While the embodiments of FIG. 5 show a closure 500 having a rectangular geometry, i.e., with the lateral sides substantially parallel to each other and substantially perpendicular to the end sides, it is to be understood that other geometries are permissible. For example, there may be a taper at the end sides, or the lateral sides curved.

Figure 6A:
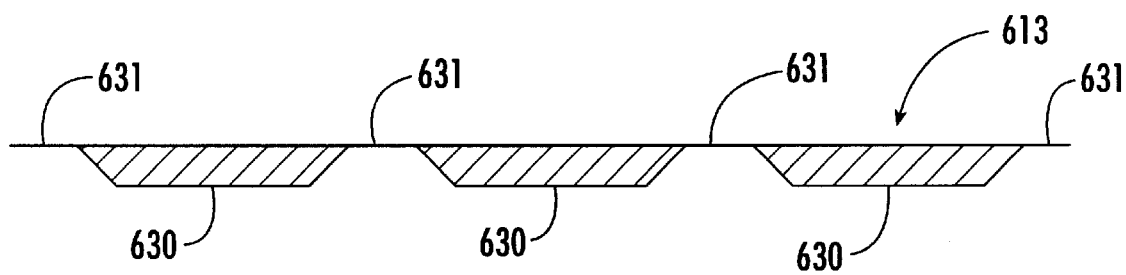
FIG. 6A is a lateral cross-sectional view of the frangible ends of the embodiments of FIG. 5.
Figure 6B:
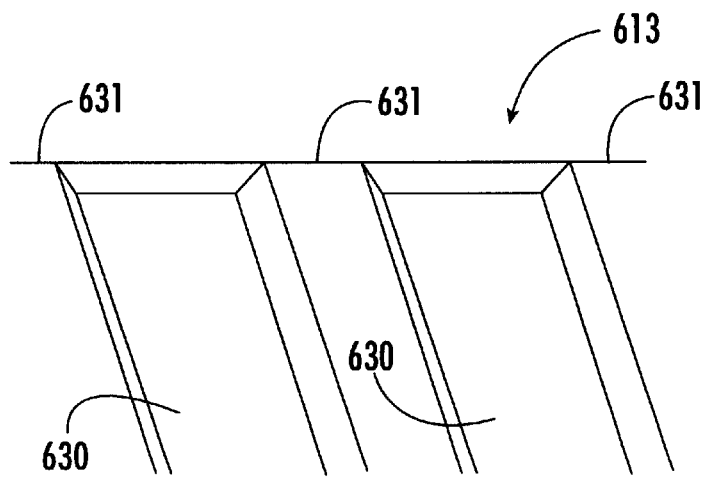
FIG. 6B is a perspective view of the frangible ends of the embodiments of FIG. 5.

Referring now to FIG. 6a, a magnified lateral cross-section view of embodiments of a frangible end side 613 will now be described. FIG. 6b shows a perspective view of the same feature. The end side 613 has a plurality of fingers 630 joined to adjacent fingers by frangible membranes 631. Upon closure of the first and the second body members 501 and 502, respectively, around a multicore cable section that projects out of the end sides, membrane 631 is stressed and ruptures or tears, permitting the splaying of fingers 630 to accommodate the cable or electrical component. The fingers 630 are preferably about 0.032 inch thick, while the membranes 631 are preferably about 0.002 inch thick.

Referring now to FIG. 7, the embodiments of FIG. 5 shown in a partially closed configuration will now be described. The closure 500 may have reinforcing ribs 710 that may decrease the deflection in the closure near fingers 630 as the enclosed gel expands during service at elevated temperatures, which can be as high as 90° C., thereby helping keep the gel under compression. Relatively heavy ribs, about 0.110 inch wide, are preferred where the closure 500 is of a rectangular shape about 1.5 inches wide by 4.5 inches longs. While the instant closure is designed to be amenable to manual closing, it may be preferable to close it by pinching near the center with a pair of pliers. To aid in this method of closing, a thickened section 746 may be provided surrounding the hole 545c to protect the button 540c projecting therethrough against damage during the pinching. To prevent opening under torsional torque, it is preferable to chamfer the buttons 540a–540c. To distribute stress concentrations more evenly and to increase the opening force, a fillet may be added to the inside of the snap lock arms.

Figure 8:
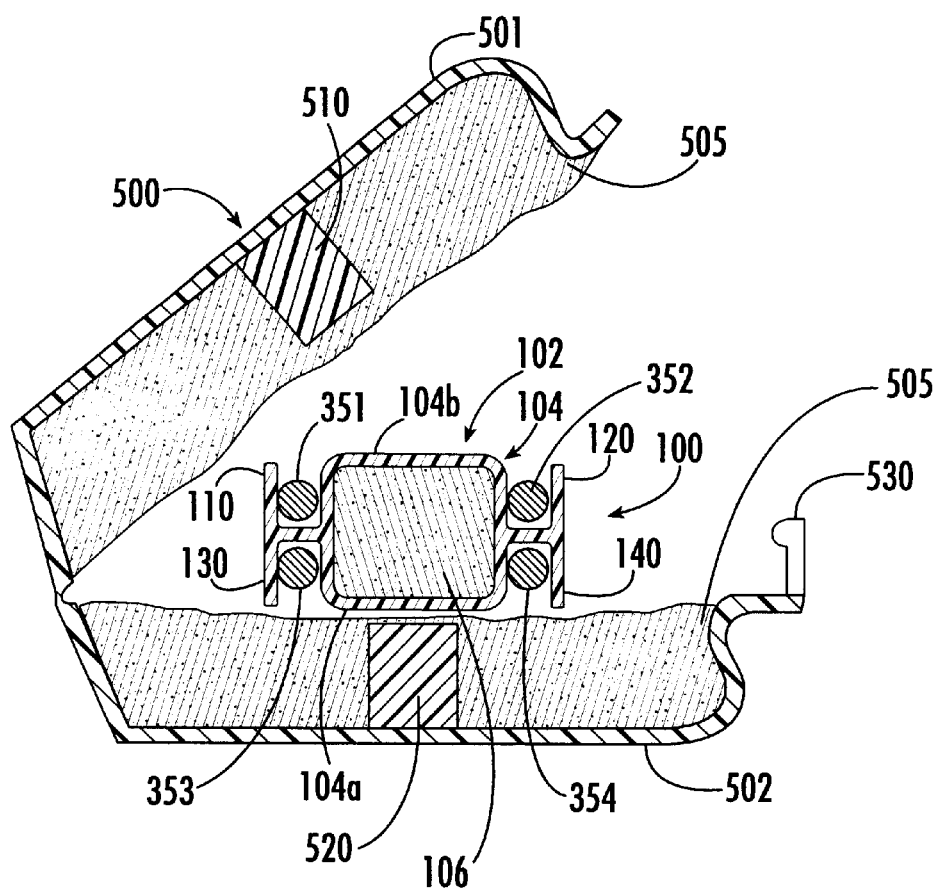
FIG. 8 is a lateral cross-sectional view of embodiments of a cable splice closure according to the present invention wherein the closure is in a first partially closed position.
Figure 9:
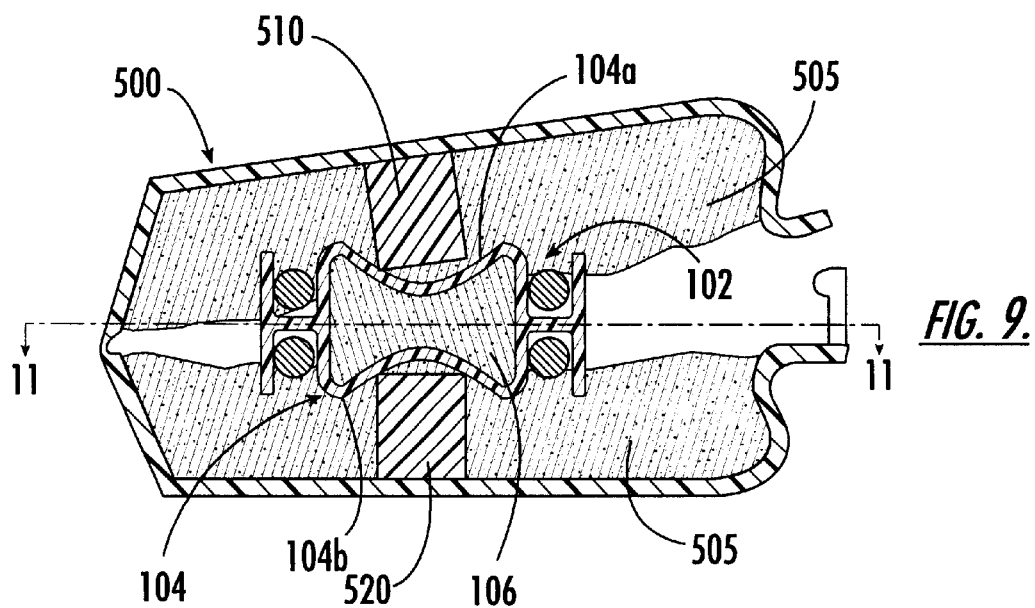
FIG. 9 is a lateral cross-sectional view of embodiments of a cable splice closure according to the present invention wherein the closure is in a second partially closed position.
Figure 10:
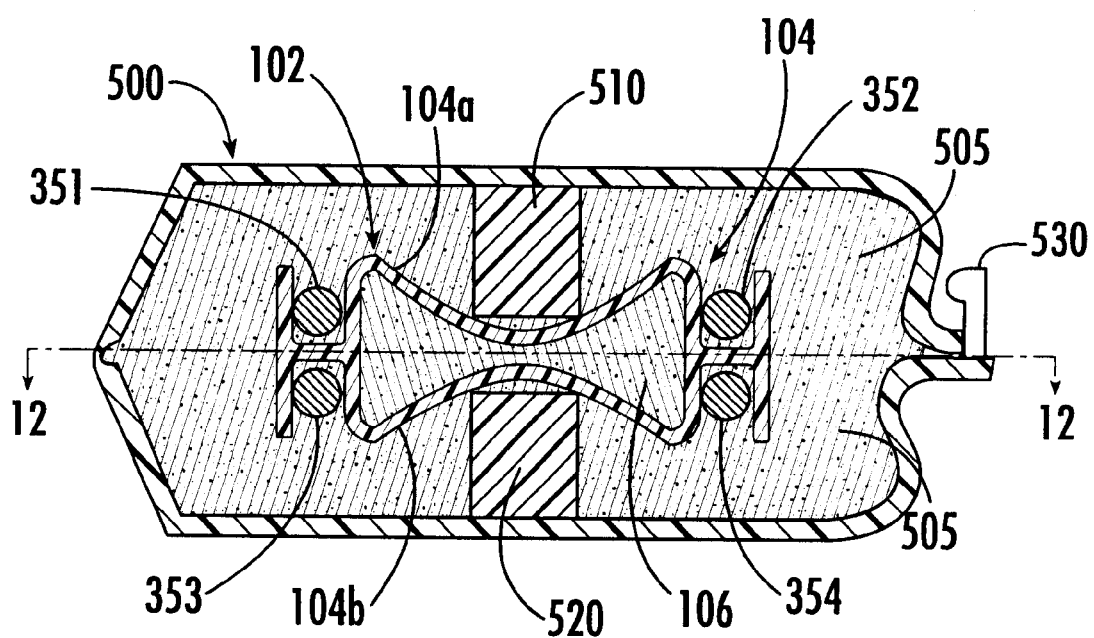
FIG. 10 is a lateral cross-sectional view of embodiments of a cable splice closure according to the present invention wherein the closure is in a substantially fully closed position.

FIGS. 8–10 illustrate a series of lateral cross-sections of embodiments of a cable splice closure according to the present invention. In a sequential manner, FIGS. 8–10 show a closure 500 being closed so as to substantially surround a wire separator 100 and a multicore cable section having four wires 351, 352, 353, and 354. Each of these figures will now be described more fully.

Referring now to FIG. 8, the wire separator 100 has a first channel member 110 defining a first channel, a second channel member 120 defining a second channel, a third channel member 130 defining a third channel, and a fourth channel member 140 defining a fourth channel as described above with reference to FIGS. 1 and 2. The wires 351, 352, 353, and 354 are positioned in the first, second, third, and fourth channels, respectively, as described above with reference to FIGS. 1, 3 and 4. The wire separator 100 has a sealant material 106 positioned within a sealant material reservoir 102 defined by a side wall 104 as described above with reference to FIG. 1.

As shown in FIG. 8, the closure 500 has a first body member 501 and a second body member 502, each substantially filled with a sealant material 505 as described above with reference to FIG. 5. A first compression member 510 extends from an interior surface of the first body member 501 and a second compression member 520 extends from the interior surface of the second body member 502 as described above with reference to FIG. 5.

As illustrated in FIG. 8, the wire separator 100 is positioned within the closure 500 such that a second edge 104b of the side wall 104 is adjacent the second compression member 520. The first body member 501 is partially open such that the first compression member 510 is not yet adjacent a first edge 104a of the side wall 104.

Referring now to FIG. 9, the first body member 501 has been positioned such that the first compression member 510 is adjacent the first edge 104a of the side wall 104. The first compression member 510 and the second compression member 520 act to compress the first edge 104a and the second edge 104b, respectively, of the side wall 104, which is made of a flexible material as described above with reference to FIG. 1. This compression reduces the volume of the sealant material reservoir 102 causing the sealant material 106 to move out of an open end of the sealant material reservoir 102, as described further hereinbelow with reference to FIG. 11.

Referring now to FIG. 10, the closure 500 substantially surrounds the wire separator 100 and the multicore cable section. The sealant material 505 substantially surrounds the wire separator 100 and the wires 351, 352, 353, and 354. The first compression member 510 and the second compression member 520 have further compressed the first edge 104a and the second edge 104b, respectively, of the side wall 104. This compression further reduces the volume of the sealant material reservoir 102 forcing more sealant material 106 to move out of the sealant material reservoir 102, as described further hereinbelow with reference to FIG. 12.

Figure 11:
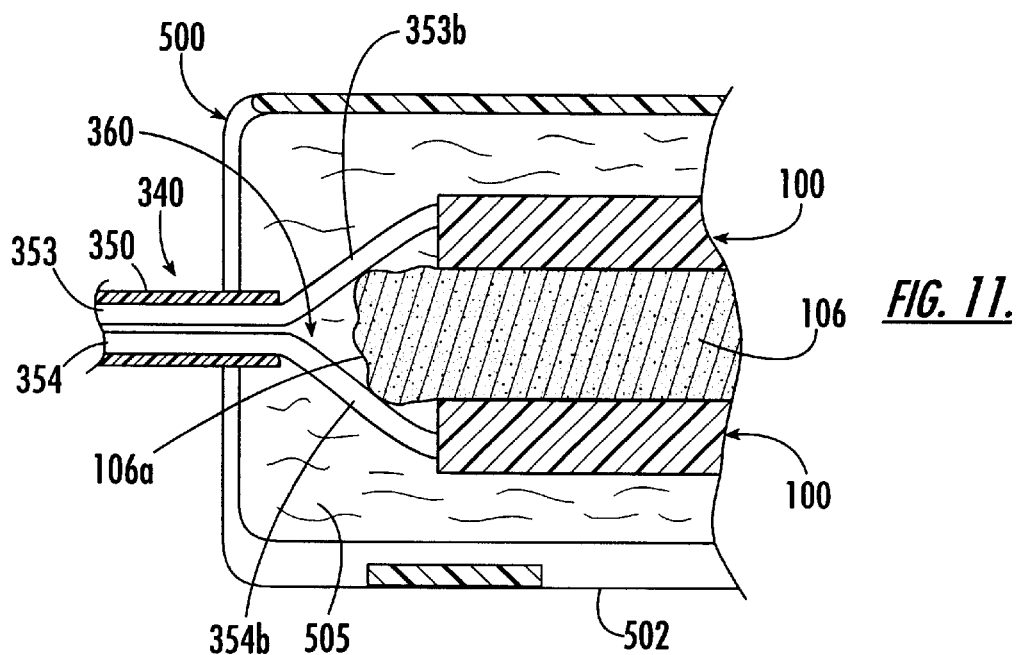
FIG. 11 is a longitudinal cross-sectional view of the embodiments illustrated in FIG. 9 taken along the line 11—11 of FIG. 9.

Referring now to FIG. 11, partial longitudinal cross-sections of embodiments of the present invention shown in FIG. 9 will now be described. The second body member 502 of the closure 500 is substantially filled with the sealant material 505 as described above with reference to FIG. 5. A multicore cable 340 has a third wire 353 and a fourth wire 354 contained in a first sheath 350 as described above with reference to FIGS. 3 and 4. First portions of the third wire 353 and the fourth wire 354 are positioned in the third and the fourth channels of the wire separator 100 as described above with reference to FIGS. 3 and 4. A second portion 353b of the third wire 353 is positioned adjacent a second portion 354b of the fourth wire 354 so as to define a portion of a first crotch region 360 as described above with reference to FIGS. 3 and 4. A sealant material 106 is positioned within the sealant material reservoir of the wire separator 100 as described above. As the volume of the sealant material reservoir is reduced, the sealant material 106a moves out of an open end of the sealant material reservoir and is positioned adjacent the first crotch region 360.

Figure 12:
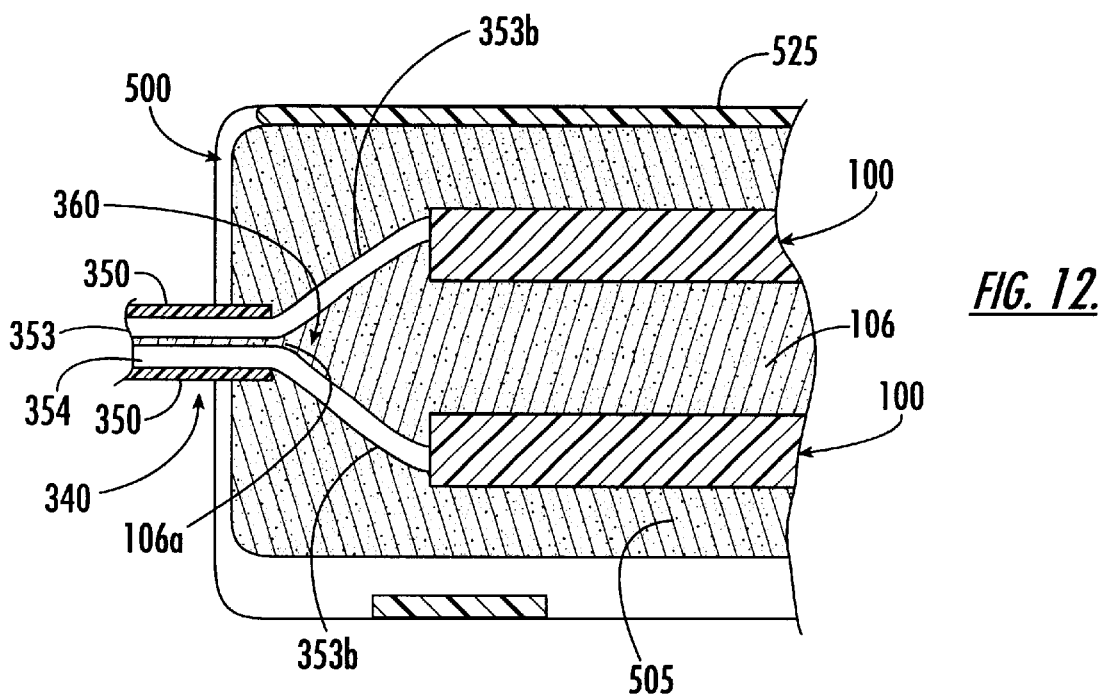
FIG. 12 is a longitudinal cross-sectional view of the embodiments illustrated in FIG. 10 taken along the line 12—12 of FIG. 10.

Referring now to FIG. 12, partial longitudinal cross-sections of embodiments of the present invention shown in FIG. 10 will now be described. As the sealant material reservoir is compressed further, the sealant material 106a is positioned substantially fully adjacent the crotch region 360.

While the embodiments illustrated in FIG. 12 show the sealant material 106a and the sealant material 505 as being distinct from one another, it is to be understood that the sealant material 106a and the sealant material 505 may come into contact with one another. The sealant material 106a and the sealant material 505 may be the same or may be different.

Figure 13:
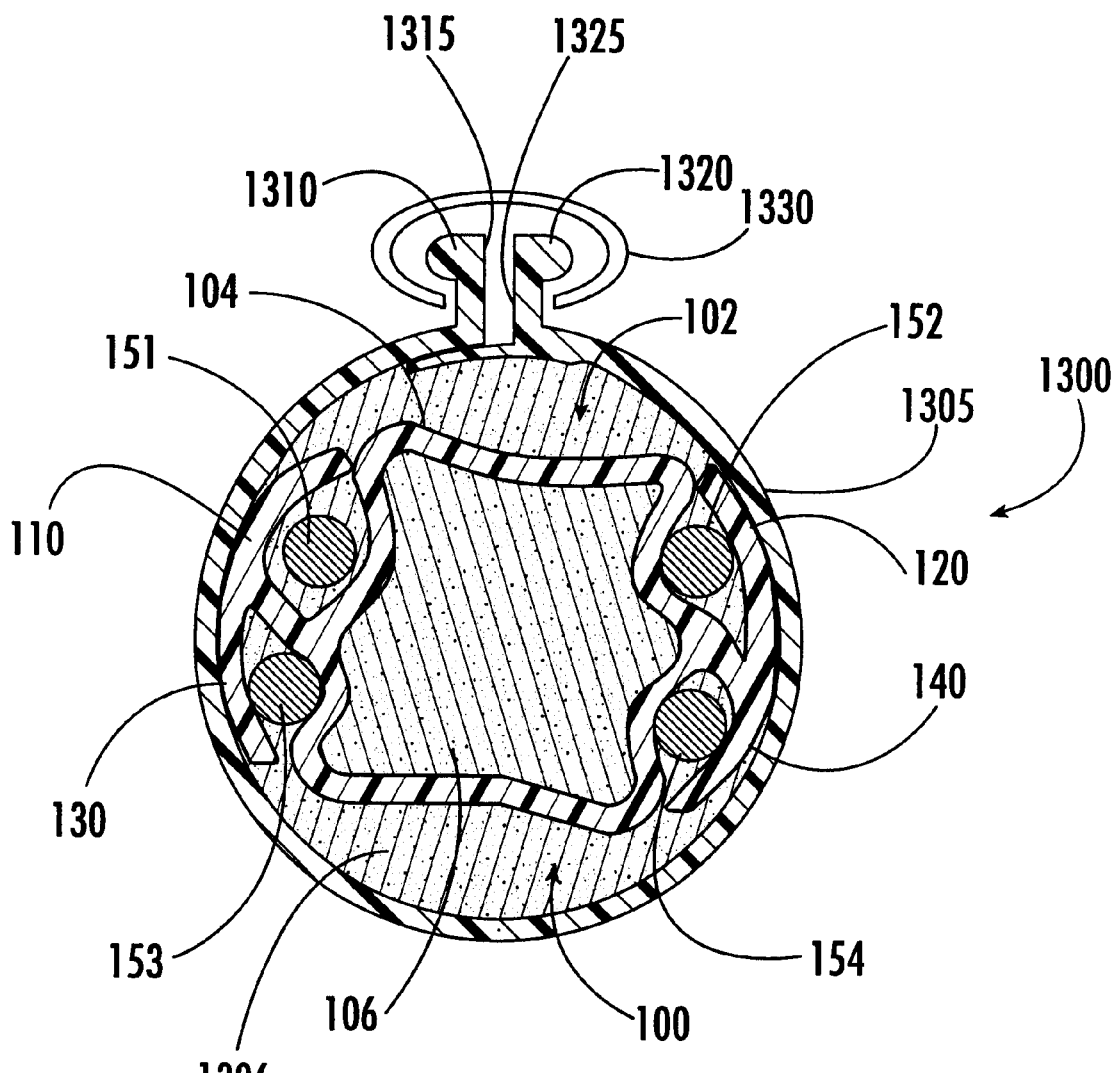
FIG. 13 is a lateral cross-sectional view of embodiments of a cable splice closure according to the present invention.

Referring now to FIG. 13, lateral cross-sections of embodiments of a cable splice closure of the present invention will now be described. The cable splice closure 1300 includes a wrap-around closure 1305, as will be understood by those skilled in the art. The wrap-around closure has a first upright member 1310 and a second upright member 1320 laterally spaced from the first upright member 1310. The first upright member has a first closure side 1315 and the second upright member has a second closure side 1325. The cable splice closure includes a wire separator 100 having a first channel member 110 defining a first channel, a second channel member 120 defining a second channel, a third channel member 130 defining a third channel, and a fourth channel member 140 defining a fourth channel as described above with reference to FIGS. 1 and 2. The cable splice closure includes a multicore cable section having wires 351, 352, 353, and 354, which are positioned in the first, second, third, and fourth channels, respectively, as described above with reference to FIGS. 1, 3 and 4. The wire separator 100 has a sealant material 106 positioned within a sealant material reservoir 102 defined by a side wall 104 as described above with reference to FIG. 1.

As illustrated in FIG. 13, when the first closure side 1315 is positioned adjacent the second closure side 1325, the wrap-around closure 1305 is configured to substantially surround the wire separator 100 and the multicore cable section. The wrap-around closure 1305 exerts pressure on the separator 100 and compresses the sealant material reservoir 102 causing the sealant material 106 to be forced into a crotch region formed by wires 151, 152, 153, and 154. The first closure side 1315 is held adjacent the second closure side 1325 using a connector 1330. While the embodiments of FIG. 13 do not show compression members on an interior surface of the wrap-around closure 1305, it is to be understood that wrap-around closures of the present invention may have interior surfaces with one or more compression members extending therefrom. Although the embodiments of FIG. 13 show first, second, third, and fourth channel members 110, 120, 130 and 140, respectively, that are flexible and bend around wires 151–154, it is to be understood that channel members of the present invention may be rigid and not bend around wires to be separated. Such rigid channel members may act as compression members.

When used as part of a cable splice closure, wire separators of the present invention may position sealant material in a crotch region formed by wires of a multicore cable. This sealant material may reduce or prevent moisture that may have entered the sheath of the multiwire cable from entering the cable splice closure.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A wire separator for separating two or more wires in a multicore cable splice closure, the wire separator comprising:

a longitudinally extending side wall, the side wall further extending circumferentially so as to define a sealant material reservoir, at least a portion of the side wall comprising a flexible material;

a first longitudinally extending channel member coupled to the side wall of the sealant material reservoir, wherein the first channel member defines a first channel;

a second longitudinally extending channel member circumferentially spaced from the first channel member and coupled to the side wall of the sealant material reservoir, wherein the second channel member defines a second channel; and a sealant material positioned within the sealant material reservoir.

2. The wire separator according to claim 1, wherein the entire side wall comprises a flexible material.

3. The wire separator according to claim 1, wherein the sealant material reservoir has a first open end.

4. The wire separator according to claim 3, wherein the sealant material reservoir has a second open end longitudinally spaced from the first open end.

5. The wire separator according to claim 1, wherein the sealant material reservoir has a rupturable seal member on at least one end thereof.

6. The wire separator according to claim 1, wherein a first portion of the side wall defines a first wall of the first channel member, and wherein a second portion of the side wall defines a first wall of the second channel.

7. The wire separator according to claim 1, further comprising:

a third longitudinally extending channel member circumferentially spaced from the first and the second channel members, the third channel member being coupled to the side wall of the sealant material reservoir and defining a third channel; and a fourth longitudinally extending channel member circumferentially spaced from the first, the second and the third channel members, the fourth channel member being coupled to the side wall of the sealant material reservoir and defining a fourth channel.

8. The wire separator according to claim 7, wherein a third portion of the side wall defines a first wall of the third channel member, and wherein a fourth portion of the side wall defines a first wall of the fourth channel.

9. The wire separator according to claim 8, wherein a portion of the first channel member defines a second wall of the third channel member, and wherein a portion of the second channel member defines a second wall of the fourth channel member.

10. The wire separator according to claim 1, wherein the flexible material has a flexural modulus between about 10,000 psi and about 100,000 psi.

11. The wire separator according to claim 1, wherein the flexible material comprises a polymeric material.

12. The wire separator according to claim 11, wherein the polymeric material is selected from the group consisting of EPDM elastomers, silicone elastomers, thermoplastic elastomers, polypropylene/rubber blends, polyurethanes, nitrile rubber, neoprene rubber, polyisoprene, polybutadiene, epichlorohydrin and polychloroprene.

13. The wire separator according to claim 1, wherein the sealant material is a gel.

14. A wire separator for separating two or more wires in a multicore cable splice closure, the wire separator comprising:

a body including:
a flexible side wall;
a sealant material reservoir formed in the body and defined at least in part by the flexible side wall; and
first and second spaced apart wire channels defined in said body; and a sealant material positioned within the sealant material reservoir.

15. A cable splice closure for environmentally sealing a multicore cable having at least a first and a second wire, the cable splice closure comprising:

a wire separator comprising:
a longitudinally extending side wall, the side wall further extending circumferentially so as to define a sealant material reservoir, at least a portion of the side wall comprising a flexible material;
a first longitudinally extending channel member coupled to the side wall of the sealant material reservoir, wherein the first channel member defines a first channel configured to receive a first portion of the first wire therein;
a second longitudinally extending channel member circumferentially spaced from the first channel member and coupled to the side wall of the sealant material reservoir, wherein the second channel member defines a second channel configured to receive a first portion of the second wire therein; and
a sealant material positioned within the sealant material reservoir; and a closure substantially surrounding the wire separator.

16. The cable splice closure according to claim 15, wherein the closure includes:

a first body member having a first compression member extending from an interior surface thereof; and a second body member having a second compression member extending from an interior surface thereof, wherein the first and the second compression members are positioned adjacent the side wall of the sealant material reservoir.

17. The cable splice closure according to claim 15, further comprising a multicore cable section having a first wire and a second wire, the first wire having a first portion positioned in the first channel and the second wire having a first portion positioned in the second channel.

18. The cable splice closure according to claim 17, wherein the multicore cable further includes a third wire and a fourth wire, and wherein the wire separator further comprises:

a third longitudinally extending channel member circumferentially spaced from the first and the second channel members, the third channel member being coupled to the side wall of the sealant material reservoir and defining a third channel configured to receive a first portion of the third wire therein; and a fourth longitudinally extending channel member circumferentially spaced from the first, the second and the third channel members, the fourth channel member being coupled to the side wall of the sealant material reservoir and defining a fourth channel configured to receive a first portion of the fourth wire therein;

and wherein the third wire has a first portion positioned in the third channel and the fourth wire has a first portion positioned in the fourth channel.

19. The cable splice closure according to claim 18, wherein the first, the second, the third, and the fourth wires each have a second portion, and wherein the second portions of the first, the second, the third, and the fourth wires are adjacent one another and define a crotch region.

20. The cable splice closure according to claim 19, wherein the sealant material reservoir has a first open end adjacent the crotch region, and wherein at least a portion of the sealant material within the sealant material reservoir is positioned adjacent the crotch region.

21. The cable splice closure according to claim 20, wherein the closure includes at least one compression member extending from an interior surface thereof, wherein the at least one compression member is positioned adjacent the longitudinal side wall of the sealant material reservoir when the closure substantially surrounds the wire separator so as to move a portion of the sealant material through the open end of the sealant material reservoir and into a region substantially adjacent the crotch region.

22. The cable splice closure according to claim 15, further comprising a sealant material substantially covering an inner surface of the closure.

23. A cable splice kit for environmentally sealing a multicore cable section, the cable splice kit comprising:
  a wire separator comprising:
    a longitudinally extending side wall, the side wall further extending circumferentially so as to define a sealant material reservoir, at least a portion of the side wall comprising a flexible material;
    a first longitudinally extending channel member coupled to the side wall of the sealant material reservoir, wherein the first channel member defines a first channel configured to receive a first portion of the first wire therein;
    a second longitudinally extending channel member circumferentially spaced from the first channel member and coupled to the side wall of the sealant material reservoir, wherein the second channel member defines a second channel configured to receive a first portion of the second wire therein; and
    a sealant material positioned within the sealant material reservoir; and a closure.

24. A method of forming a multicore cable splice closure, said method comprising the steps of:
  positioning a first wire of a multicore cable in a first channel of a wire separator, wherein the wire separator has a sealant material reservoir containing sealant material;
  positioning a second wire of the multicore cable in a second channel of the wire separator;
  enclosing the first wire, the second wire, and the wire separator in a closure; and
  compressing the sealant material reservoir to transfer the sealant material from an open end of the sealant material reservoir into a crotch region defined by the first and the second wires.

25. The method according to claim 24, wherein the step of enclosing and the step of compressing are performed substantially simultaneously.

* * * * *